(12) United States Patent
Takaoka et al.

(10) Patent No.: US 10,833,548 B2
(45) Date of Patent: Nov. 10, 2020

(54) STATOR, MOTOR, AND BLOWER

(71) Applicant: Nidec Corporation, Kyoto (JP)

(72) Inventors: Tsukasa Takaoka, Kyoto (JP); Atsushi Nishikawa, Kyoto (JP); Shogo Hakozaki, Kyoto (JP); Makoto Katsunaga, Kyoto (JP); Daisuke Ohashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 113 days.

(21) Appl. No.: 16/211,367

(22) Filed: Dec. 6, 2018

(65) Prior Publication Data
US 2019/0199155 A1 Jun. 27, 2019

(30) Foreign Application Priority Data

Dec. 22, 2017 (JP) ................. 2017-246700

(51) Int. Cl.
*H02K 3/20* (2006.01)
*H02K 3/28* (2006.01)
*H02K 1/14* (2006.01)
*H02K 3/52* (2006.01)
*H02K 7/14* (2006.01)
*F04D 25/06* (2006.01)
*H02K 21/22* (2006.01)

(52) U.S. Cl.
CPC .............. *H02K 3/20* (2013.01); *F04D 25/06* (2013.01); *F04D 25/0646* (2013.01); *H02K 1/146* (2013.01); *H02K 3/28* (2013.01); *H02K 3/522* (2013.01); *H02K 7/14* (2013.01); *H02K 21/22* (2013.01); *H02K 2203/06* (2013.01)

(58) Field of Classification Search
CPC ............ H02K 3/20; H02K 3/28; H02K 1/146; H02K 3/522; H02K 7/14; H02K 21/22; H02K 2203/06; H02K 3/52; H02K 5/521; F04D 25/0646; F04D 25/06; F04D 25/08
USPC .................................. 310/71, 179, 180, 208
See application file for complete search history.

(56) References Cited

U.S. PATENT DOCUMENTS

| 4,481,435 | A | * | 11/1984 | Loforese | H02K 3/522 310/194 |
| 8,604,804 | B2 | | 12/2013 | Ogawa et al. | |
| 9,000,629 | B2 | | 4/2015 | Yokogawa et al. | |
| 9,472,988 | B2 | | 10/2016 | Sonoda et al. | |

(Continued)

FOREIGN PATENT DOCUMENTS

| JP | 2000-188839 A | 7/2000 |
| JP | 2005-245163 A | 9/2005 |

(Continued)

*Primary Examiner* — Thomas Truong
(74) *Attorney, Agent, or Firm* — Keating & Bennett

(57) ABSTRACT

A stator of a polyphase motor in which in-phase coils are connected in parallel includes an annular core back, teeth extending radially from the core back and arranged circumferentially, a slot between two adjacent teeth, conducting wires respectively wound around the teeth to define the coils, and first and second connectors to which ends of each of the in-phase coils are connected, respectively. The conducting wire includes one or two jumper wires between each coil and the first connector or the second connector, and at least one jumper wire extends in an identical circumferential direction from the first connector toward the second connector with respect to all the in-phase coils.

12 Claims, 14 Drawing Sheets

(56) References Cited

U.S. PATENT DOCUMENTS

| | | | | |
|---|---|---|---|---|
| 2004/0245887 A1* | 12/2004 | Fujinaka | ............. | H02K 21/222 |
| | | | | 310/216.114 |
| 2005/0029892 A1* | 2/2005 | Ariyoshi | ................ | H02K 3/522 |
| | | | | 310/198 |
| 2013/0334917 A1* | 12/2013 | Miyabara | ................. | H02K 7/14 |
| | | | | 310/71 |
| 2015/0311760 A1* | 10/2015 | Iwasaki | ................... | H02K 3/28 |
| | | | | 310/71 |
| 2018/0248432 A1* | 8/2018 | Ikeda | ..................... | H02K 3/522 |

FOREIGN PATENT DOCUMENTS

| | | |
|---|---|---|
| JP | 2009-232650 A | 10/2009 |
| JP | 2011-239589 A | 11/2011 |

\* cited by examiner

STATOR, MOTOR, AND BLOWER

CROSS REFERENCE TO RELATED APPLICATIONS

This application claims the benefit of priority to Japanese Patent Application No. 2017-246700 filed on Dec. 22, 2017. The entire contents of this application are hereby incorporated herein by reference.

BACKGROUND OF THE INVENTION

1. Field of the Invention

The present disclosure relates to a stator, a motor, and a blower.

2. Description of the Related Art

For example, Japanese Patent Laid-open Publication No. 2000-188839 discloses a conventional stator. The stator includes an annular core back, a plurality of teeth extending radially from the core back and being circumferentially arranged, a slot formed between adjacent teeth, and a conducting wire wound around the tooth to form a coil.

The plurality of coils are connected in series, and both ends of the conducting wire are drawn from the different slots to an outside of the stator. A jumper wire extending from one end of the conducting wire toward the coil and a jumper wire returning from the coil to the other end of the conducting wire are disposed on the same path.

However, in the stator disclosed in Japanese Laid-open Patent Application Publication 2000-188839, when the drive current is passed through the conducting wire, a direction of the current passed through the coil and a direction of the current passed through the jumper wire returning from the coil are different from each other. For this reason, inductance of the coil is changed by a magnetic field generated from the jumper wire returning from the coil, which results in uneven rotation of a rotor.

SUMMARY OF THE INVENTION

According to an exemplary embodiment of the present disclosure, a stator of a polyphase motor in which in-phase coils are connected in parallel includes a core back having an annular shape; a plurality of teeth extending radially from the core back and arranged circumferentially; a slot between an adjacent pair of the teeth; a conducting wire respectively wound around the teeth to define the coils; and a first connector and a second connector to which one end and the other end of each of the plurality of in-phase coils are connected, respectively. The conducting wire includes one or two jumper wires disposed between each coil and the first connector or the second connector, and at least one jumper wire extends in an identical circumferential direction from the first connector toward the second connector with respect to all the in-phase coils.

Exemplary embodiments of the present disclosure provide stators, motors, and blowers each capable of preventing uneven rotation of a rotor.

The above and other elements, features, steps, characteristics and advantages of the present discloser will become more apparent from the following detailed description of the preferred embodiments with reference to the attached drawings.

DETAILED DESCRIPTION OF THE PREFERRED EMBODIMENTS

Hereinafter, exemplary embodiments of the present disclosure will be described in detail with reference to the drawings. In the specification, a direction parallel to a center axis of a motor is referred to as an "axial direction", a direction orthogonal to the center axis of the motor is referred to as a "radial direction", and a direction along a circular arc having a center on the center axis of the motor is referred to as a "circumferential direction". In the description of the present disclosure, it is also assumed that an axial direction is defined as a vertical direction, and that a side on which an impeller is disposed with respect to a motor is defined as an upper side. A shape and a positional relationship of each component will be described based on the above assumption. The vertical direction is simply used for the description, but does not limit an actual positional relationship and an actual direction.

Figure 1:
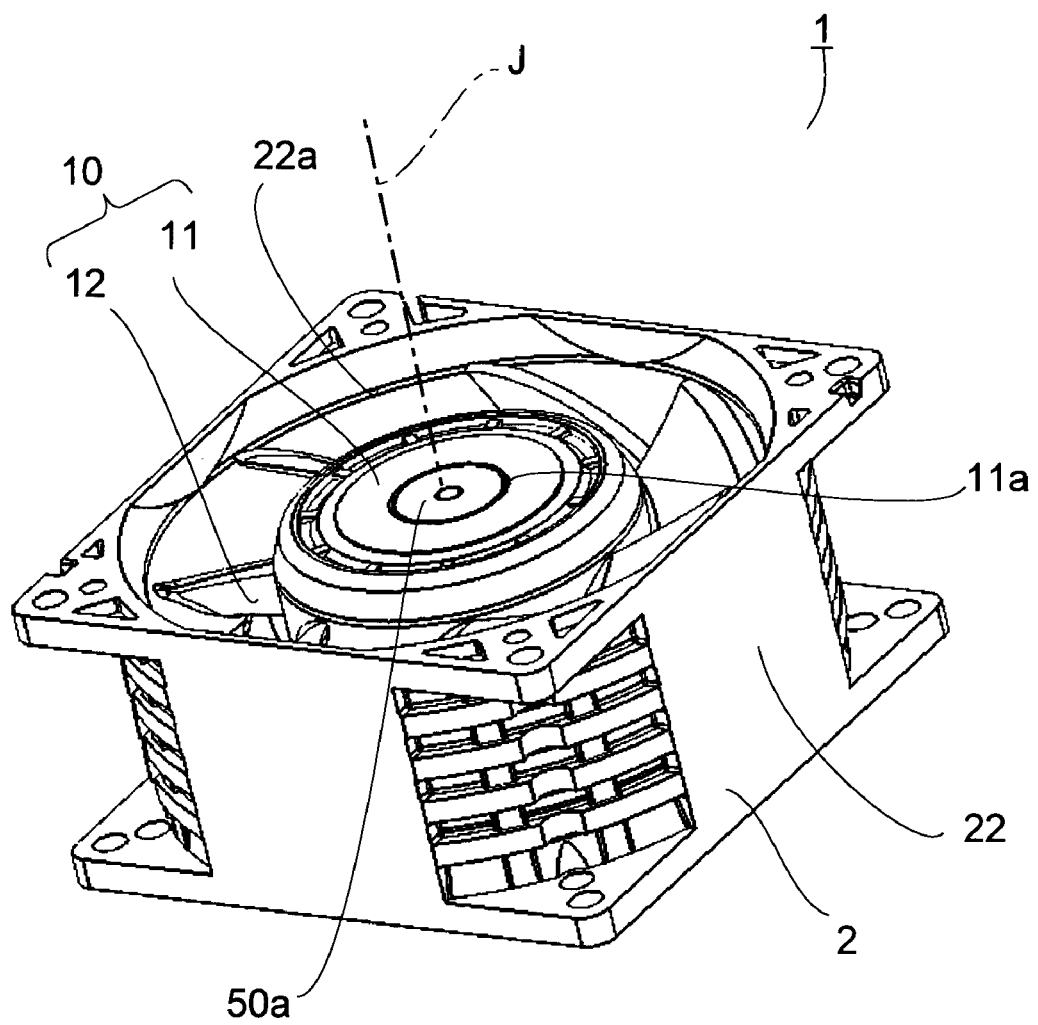
FIG. 1 is a perspective view illustrating a blower according to an exemplary embodiment of the present disclosure.
Figure 2:
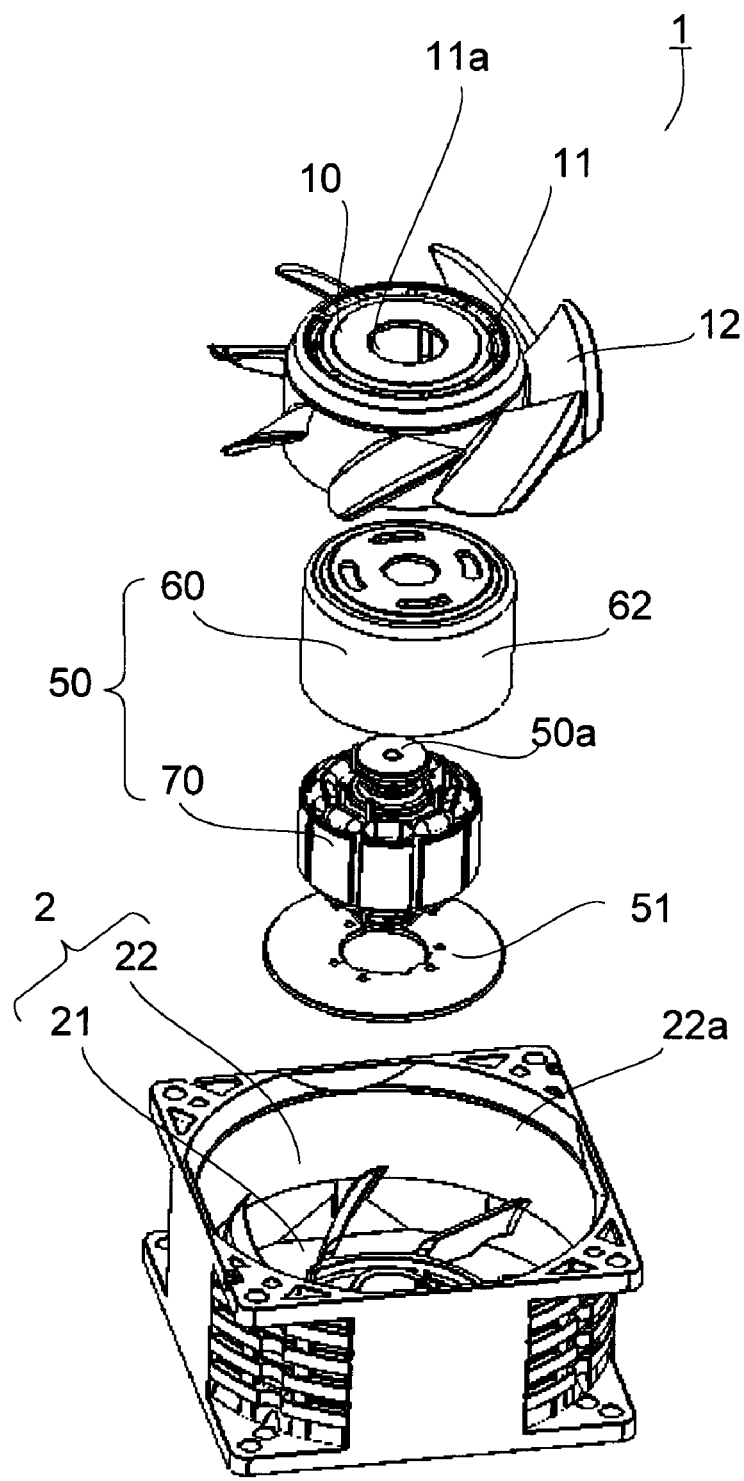
FIG. 2 is an exploded perspective view illustrating a blower according to an exemplary embodiment of the present disclosure.

A blower according to an exemplary embodiment of the present disclosure will be described. FIGS. 1 and 2 are respectively a perspective view and an exploded perspective view illustrating a blower 1 of the embodiment of the present disclosure.

The blower 1 includes a casing 2, an impeller 10, and a motor 50, and the impeller 10 and the motor 50 are accommodated in an internal space of the casing 2. The motor 50 is located below the impeller 10, and rotates the impeller 10 about a center axis J.

The casing 2 is formed into a cylindrical shape, and includes a bottom wall 21 and a peripheral wall 22. The motor 50 is attached to the bottom wall 21, and the peripheral wall 22 extends axially upward from a peripheral edge of the bottom wall 21. An air outlet 22a is opened to an upper surface of the peripheral wall 22, and a suction port (not illustrated) is opened to the bottom wall 21. The motor 50 is attached to the bottom wall 21.

The impeller 10 includes a cup 11 and a blade 12. The cup 11 is formed into a closed cylindrical shape, and the motor 50 is disposed in the cup 11. An insertion hole 11a is made in a center (on the center axis J) of the cup 11. A shaft 50a coupled to a shaft 61 (see FIG. 3) of the motor 50 is inserted in the insertion hole 11a. The shaft 50a is fixed to a rotor holder 62 (to be described later), and the rotor holder 62 is fixed to the inside of the cup 11. Consequently, the impeller 10 and the motor 50 are coupled to each other, and the impeller 10 is supported so as to be rotatable about the center axis J.

A plurality of blades 12 are circumferentially arranged at predetermined intervals while extending radially outward from an outer circumferential surface of the cup 11. The impeller 10 is rotated by drive of the motor 50, and an airflow flowing from the suction port into the casing 2 is blown out from the air outlet 22a.

Figure 3:
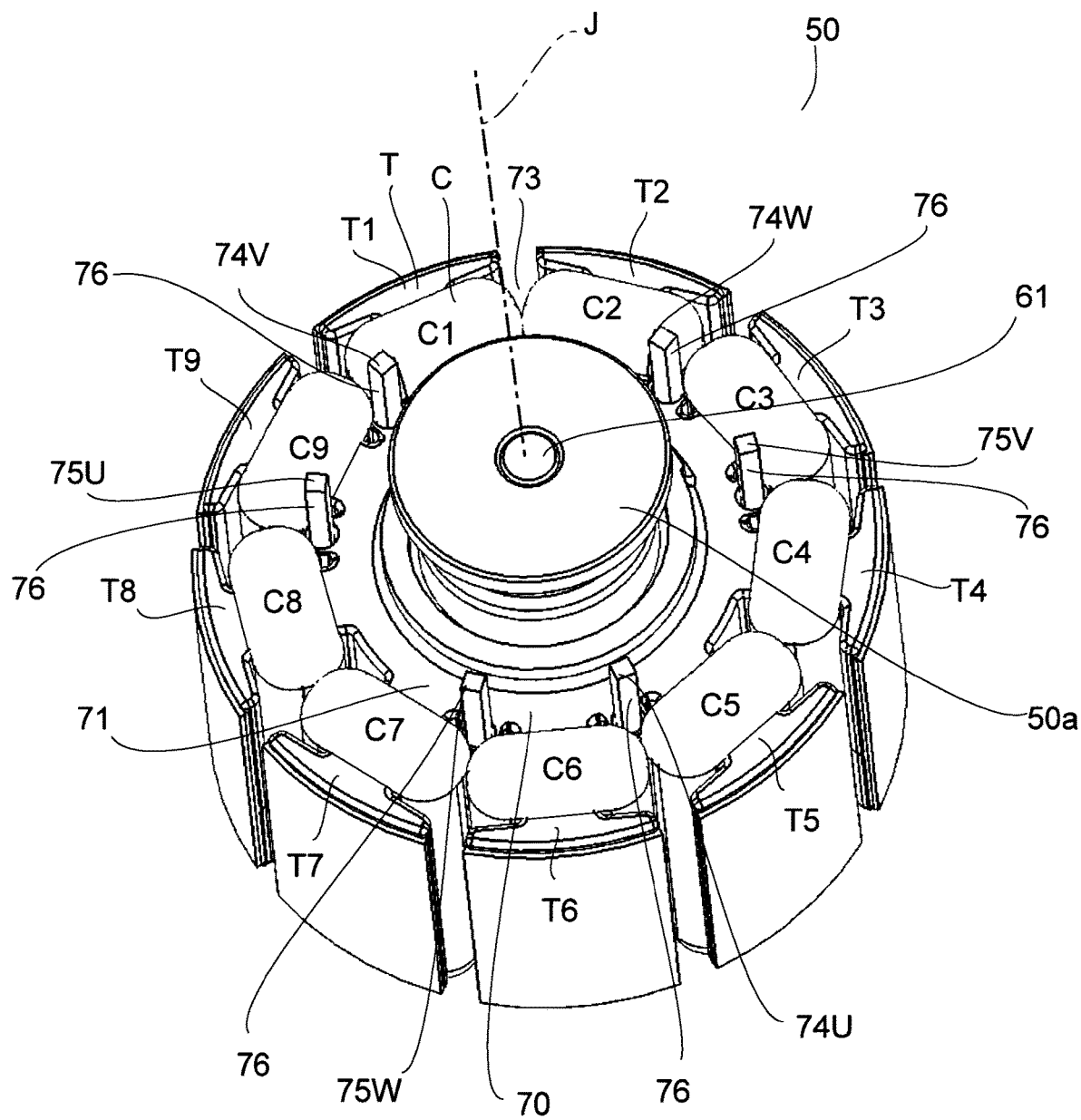
FIG. 3 is a perspective view illustrating a portion of a motor of a blower according to an exemplary embodiment of the present disclosure.
Figure 4:
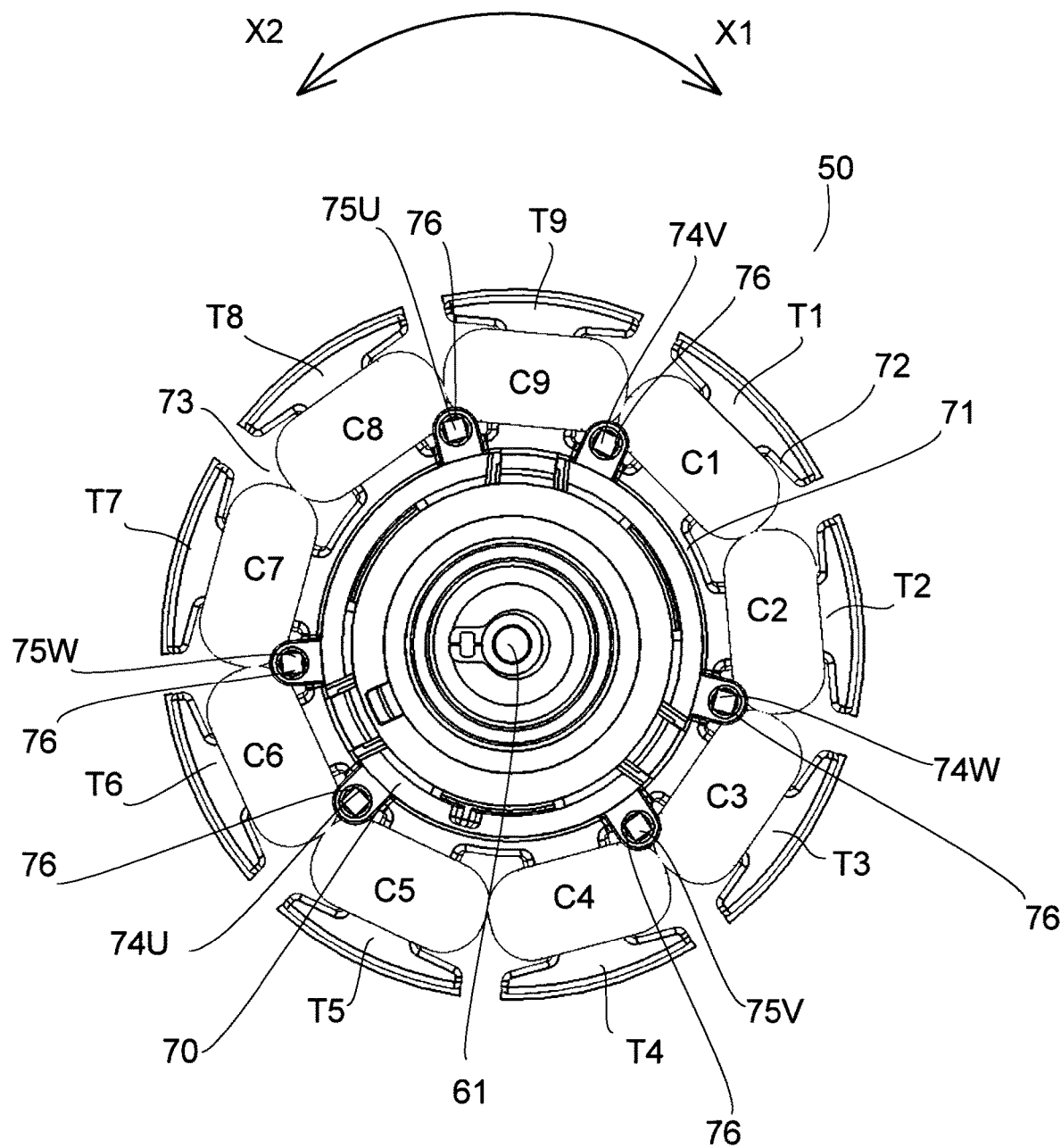
FIG. 4 is a plan view illustrating a portion of a motor of a blower according to an exemplary embodiment of the present disclosure.

FIGS. 3 and 4 are respectively a perspective view and a top view illustrating a part of the motor 50. The motor 50 includes a rotor 60 (see FIG. 2) and a stator 70.

The rotor 60 includes a columnar shaft 61 that forms a rotating shaft extending along the center axis J, a rotor holder (see FIG. 2), and a rotor magnet (not illustrated). The shaft is supported by a bearing (not illustrated) so as to be rotatable about the center axis J. The rotor holder 62 has a closed cylindrical shape, and is fixed to the inside of the cup 11. The rotor magnet is fixed to the inner circumferential surface of the rotor holder 62, and disposed so as to be opposed to the radially outside of the stator 70.

When the motor 50 is driven, torque is generated between the stator 70 and the rotor magnet. The motor 50 may be either an outer rotor type motor or an inner rotor type motor.

The stator 70 is disposed so as to be radially opposed to the rotor 60. The stator 70 includes a core back 71, a tooth T, and a coil C.

The core back 71 is annularly formed around the center axis J, and constructed with a laminated steel plate. The tooth T extends radially outward from the core back 71, and are circumferentially disposed at equal intervals. Consequently, the stator 70 for the outer rotor type motor is formed, and the motor 50 that prevents rotational unevenness of the rotor 60 to reduce vibration of the rotor 60 can be provided.

The coil C is formed by winding a conducting wire L (see FIGS. 6 to 8) around the tooth T with an insulator 72 interposed between the conducting wire L and the tooth T. In the following description, reference numerals T1 to T9 are added to the circumferentially-arranged teeth. Reference numerals C1 to C9 are added to the coils arranged at the positions corresponding to the teeth T1 to T9. Reference numerals L1 to L9 are added to the conducting wires constituting the coils C1 to C9.

A slot 73 being a space is formed between adjacent teeth T1 to T9. For example, terminal pins 76 extending in the axial direction are provided in the slots 73 between the teeth T2, T3, between the teeth T3, T4, between the teeth T5, T6, between the teeth T6, T7, between the teeth T8, T9, and between the teeth T9, T1. An upper end and a lower end of the terminal pin 76 protrude axially from the core back 71, and the lower end of the terminal pin 76 is mounted on a mounting board 51 (see FIG. 2).

The upper end of the terminal pin 76 is connected to first connectors 74U, 74V, 74W and second connectors 75U, 75V, 75W (to be described later).

Figure 5:
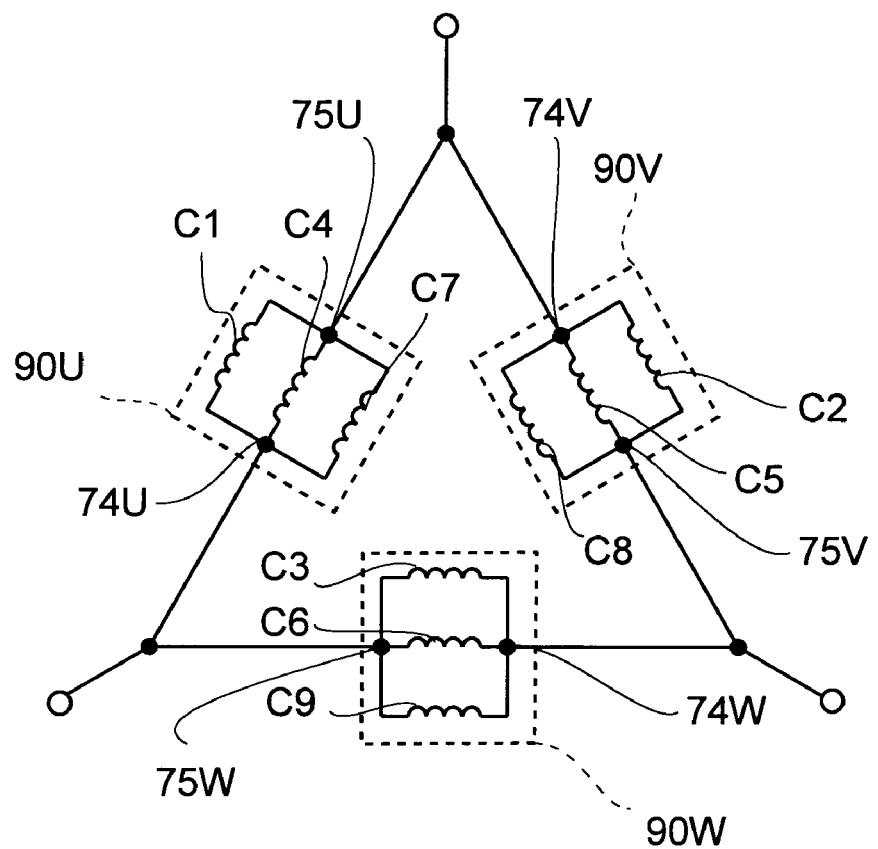
FIG. 5 is an example of a connection diagram illustrating a coil of a blower according to an exemplary embodiment of the present disclosure.

FIG. 5 illustrates an example of a connection diagram of the coils C1 to C9. The coils C1 to C9 are classified into three kinds of coil groups of a U-phase group 90U, a V-phase group 90V, and a W-phase group 90W corresponding to a three-phase AC current. The U-phase group 90U, the V-phase group 90V, and the W-phase group 90W are connected to one another by delta connection.

The U-phase group 90U is constructed with the coils C1, C4, C7. The V-phase group 90V is constructed with the coils C2, C5, C8. The W-phase group 90W is constructed with the coils C3, C6, C9. The coils C1 to C9 are circumferentially arranged in order of the U-phase, the V-phase and the W-phase, and the in-phase coils are not adjacent in the circumferential direction (see FIG. 4). The phases of the coils C adjacent to each other in the circumferential direction are different from each other, so that the rotational unevenness of the rotor 60 can be prevented to reduce the vibration of the rotor 60.

The coils C1, C4, C7 of the U-phase group 90U are connected in parallel. One end of each of the coils C1, C4, C7 is connected by the first connector 74U and the other end is connected by the second connector 75U. The first connector 74U is connected to the upper end of the terminal pin 76 disposed between the teeth T5, T6. The second connector 75U is connected to the upper end of the terminal pin 76 disposed between the teeth T8, T9 (see FIG. 4).

The coils C2, C5, C8 of the V-phase group 90V are connected in parallel. One end of each of the coils C2, C5, C8 is connected by the first connector 74V and the other end is connected by the second connector 75V. The first connector 74V is connected to the upper end of the terminal pin 76 disposed between the teeth T9, T1. The second connector 75V is connected to the upper end of the terminal pin 76 disposed between the teeth T3, T4 (see FIG. 4).

The coils C3, C6, C9 of the W-phase group 90W are connected in parallel. One end of each of the coils C3, C6, C9 is connected by the first connector 74W, and the other end is connected by the second connector 75W. The first connector 74W is connected to the upper end of the terminal pin 76 disposed between the teeth T2, T3. The second connector 75W is connected to the upper end of the terminal pin 76 disposed between the teeth T6, T7 (see FIG. 4).

Each of the three in-phase coils C1, C4, C7, the three in-phase coils C2, C5, C8, and the three in-phase coils C3, C6, C9 is connected in parallel, so that a resistance value of each coil group can be decreased to improve efficiency and output of the motor 50 as compared with the case that the three in-phase coils are connected in series.

By connecting the coil groups in each of which the three in-phase coils C are connected in parallel by the delta connection, the resistance value of each coil group can be decreased as compared with the case that the coil groups are connected by Y connection. Additionally, because necessity to gather common wires in performing the connection by the Y connection is eliminated, workability of connection is improved and productivity is also improved.

FIGS. 6 to 14 are explanatory views illustrating winding patterns of the conducting wires constituting the U-phase group 90U, the V-phase group 90V, and the W-phase group 90W. FIGS. 6 to 14 illustrate the state in which the direction of the center axis J is viewed from the radial outside while the teeth T1 to T9 circumferentially arranged side by side are linearly developed.

The conducting wire L constituting the coil C includes a first winding unit 82, a first jumper wire 83a, a second jumper wire 83b, a first lead wire 84a, and a second lead wire 84b. For example, the coil C is formed by winding the conducting wire L clockwise around the tooth T a plurality of times when the direction of the center axis J is viewed from the radial outside.

In the coil C, the conducting wire L is wound radially outward from the radially inner end of the tooth T, and then wound toward the radially inner end again. The conducting wire L reciprocates between the radial inside and the radial outside of the tooth T, and ends the winding in the vicinity of the radially inner end to form the coil C.

The first lead wire 84a is disposed at one end side of the conducting wire L, and the upper end of the first lead wire 84a is connected to one of the first connectors 74U, 74V, 74W. The first lead wire 84a extends axially downward from the axially upper side toward the lower surface side of the tooth T through a slot 73.

The second lead wire 84b is disposed on the other end side of the conducting wire L, and the upper end of the second lead wire 84b is connected to one of the second connectors 75U, 75V, 75W. The second lead wire 84b extends axially upward from the lower surface side of the tooth T through the slot 73.

The parallel-connected in-phase conducting wires L are extracted from the same slot 73 by the first lead wire 84a and the second lead wire 84b. Consequently, the parallel-connected conducting wires L are gathered to further improve connection workability.

The first jumper wire 83a is disposed between the coil C and the first connectors 74U, 74V, 74W, and the second jumper wire 83b is disposed between the coil C and the second connectors 75U, 75V, 75W. When the conducting wire L is wound around the tooth T from the lower ends of the first lead wire 84a and the second lead wire 84b, and when the first lead wire 84a and the second lead wire 84b are adjacent to the coil C, the first jumper wire 83a or the second jumper wire 83b are not provided. For example, in FIG. 12, the first lead wire 84a and the coil C3 are adjacent to each other, and the first jumper wire 83a is not provided. That is, the conducting wire L has one or two jumper wires disposed between the coil C and the first connectors 74U, 74V, 74W or the second connectors 75U, 75V, 75W.

At least the first jumper wire 83a or the second jumper wire 83b extends in the same circumferential direction from the first connectors 74U, 74V, 74W toward the second connectors 75U, 75V, 75W with respect to all the in-phase coils C. This enables the reduction of the change in inductance of the coil C due to the magnetic field generated by the first jumper wire 83a or the second jumper wire 83b. Thus, the rotation unevenness of the rotor 60 can be prevented.

The first jumper wire 83a and the second jumper wire 83b extend circumferentially on the lower surface side of the tooth T. That is, the first jumper wire 83a and the second jumper wire 83b are disposed on one side in the axial direction of the tooth T. The first connectors 74U, 74V, 74W and the second connectors 75U, 75V, 75W are disposed on the other side in the axial direction of the tooth T.

Consequently, when the first connectors 74U, 74V, 74W and the second connectors 75U, 75V, 75W are connected to the terminal pins 76 by, for example, soldering, the first jumper wires 83a and the second jumper wires 83b do not become an obstacle, and the workability is improved. On the other hand, when the first jumper wire 83a and the second jumper wire 83b are circumferentially extended, the first connectors 74U, 74V, 74W and the second connectors 75U, 75V, 75W do not become an obstacle, and the workability of winding the conducting wire L is improved.

The first winding unit 82 relays the first jumper wire 83a or the second jumper wire 83b, and can prevent looseness of the first jumper wire 83a or the second jumper wire 83b extending circumferentially.

The first winding unit 82 is formed by winding the conducting wire L clockwise around the tooth T more than a half turn and less than one turn when the direction of the center axis J is viewed from the radial outside. Specifically, the conducting wire L extends axially upward from the lower surface side of the tooth T through the slot 73, extends circumferentially on the upper surface of one tooth T, and extends axially downward from the adjacent slot 73.

The first winding unit 82 in which the conducting wire L is wound around the tooth T a half turn is disposed on the tooth T in which the in-phase coil C is disposed. Consequently, the first winding unit 82 is disposed in the vicinity of the middle of the first jumper wire 83a or the second jumper wire 83b, so that the looseness of the first jumper wire 83a or the second jumper wire 83b can further be prevented.

The first winding unit 82 is wound in the same direction as the winding direction of the coil C. Consequently, the first winding unit 82 can be prevented from canceling the magnetic field of the coil C.

When having a small influence on the inductance of the coil C, the first winding unit 82 may be formed by winding the conducting wire L around the tooth T at least one turn. At this point, the looseness of the first jumper wire 83a or the second jumper wire 83b can further be prevented.

The first winding unit 82 is disposed in the tooth T in which the in-phase coil C is disposed. Consequently, the first winding unit 82 is disposed in the vicinity of the middle of the first jumper wire 83*a* or the second jumper wire 83*b*, so that the looseness of the first jumper wire 83*a* or the second jumper wire 83*b* can further be prevented.

Figure 6:
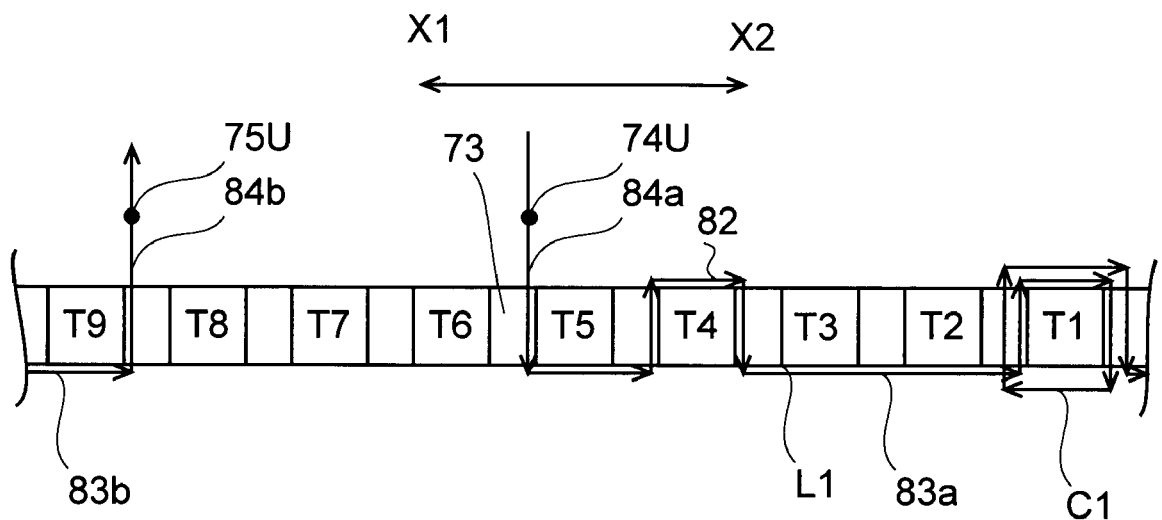
FIG. 6 is an explanatory view illustrating a winding pattern of a conducting wire of a blower according to an exemplary embodiment of the present disclosure.
Figure 7:
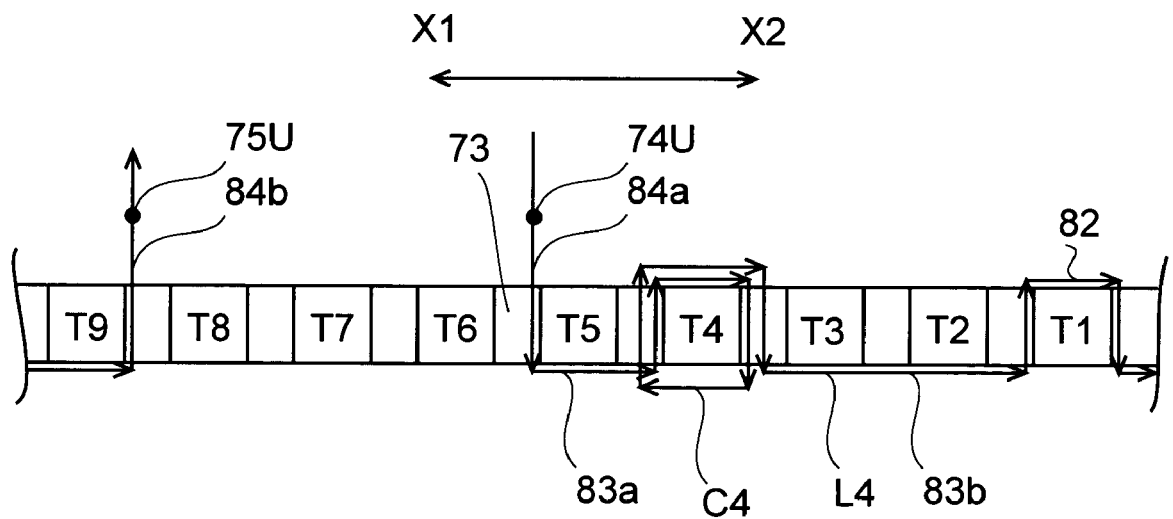
FIG. 7 is an explanatory view illustrating a winding pattern of a conducting wire of a blower according to an exemplary embodiment of the present disclosure.
Figure 8:
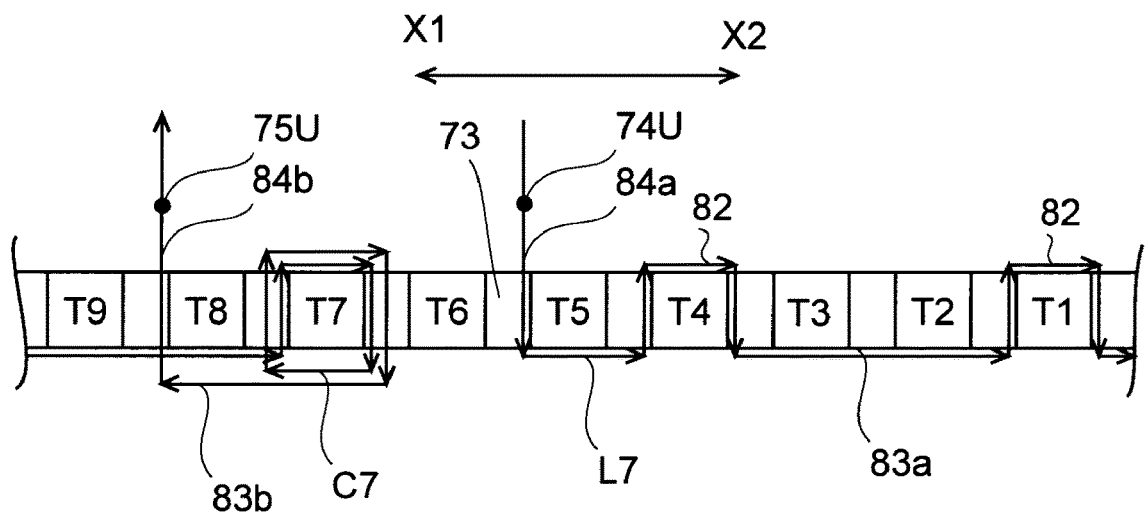
FIG. 8 is an explanatory view illustrating a winding pattern of a conducting wire of a blower according to an exemplary embodiment of the present disclosure.

The winding patterns of the conducting wires L1 to L9 constituting the coils C1 to C9 will be specifically described below. As illustrated in FIGS. 6 to 8, in the conducting wires L1, L4, L7 constituting the coils C1, C4, C7 of the U phase group 90U, the first lead wire 84*a* extends to the lower surface side of the tooth T5 through the slot 73 between the teeth T5, T6.

The second lead wire 84*b* of the conducting wires L1, L4 extends axially upward from the lower surface side of the tooth T9 through the slot 73 between the teeth T8, T9. The second lead wire 84*b* of the conducting wire L7 extends axially upward from the lower surface side of the tooth T8 through the slot 73 between the teeth T8, T9.

The conducting wires L1, L4, L7 disposed between the first lead wire 84*a* and the second lead wire 84*b* pass through the far side in the circumferential direction. In the U-phase group 90U, all the first jumper wire 83*a* and the second jumper wire 83*b* of the conducting wires L1, L4 and the first jumper wire 83*a* of the conducting wire L7 extend from the first connector 74U toward the second connector 75U in a counterclockwise direction X2 in planar view. Thus, the change in inductance of the coils C1, C4, C7 due to the magnetic field generated by the first jumper wire 83*a* or the second jumper wire 83*b* can be reduced. Thus, the rotation unevenness of the rotor 60 can be prevented.

The second jumper wire 83*b* of the conducting wire L7 extends from the first connector 74U toward the second connector 75U in a clockwise direction X1 in planar view. However, the second jumper wire 83*b* of the conducting wire L7 is shorter than the first jumper wire 83*a* of the conducting wire L7, and the magnetic field generated by the second jumper wire 83*b* of the conducting wire L7 is smaller than the magnetic field generated by the first jumper wire 83*a* of the conducting wire L7. For this reason, the influence on the inductance can be ignored.

Figure 9:
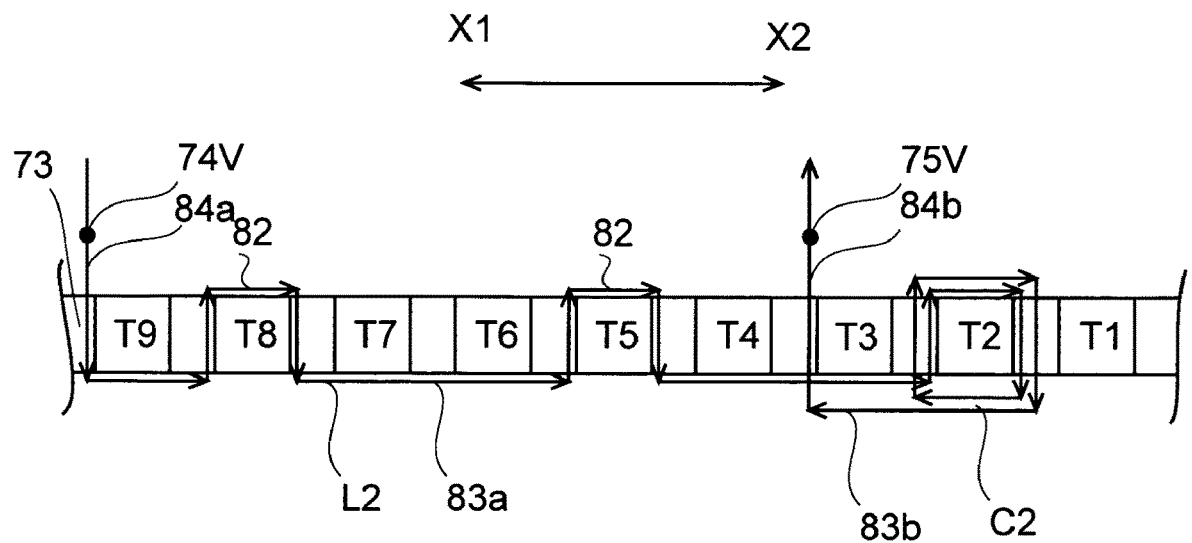
FIG. 9 is an explanatory view illustrating a winding pattern of a conducting wire of a blower according to an exemplary embodiment of the present disclosure.
Figure 10:
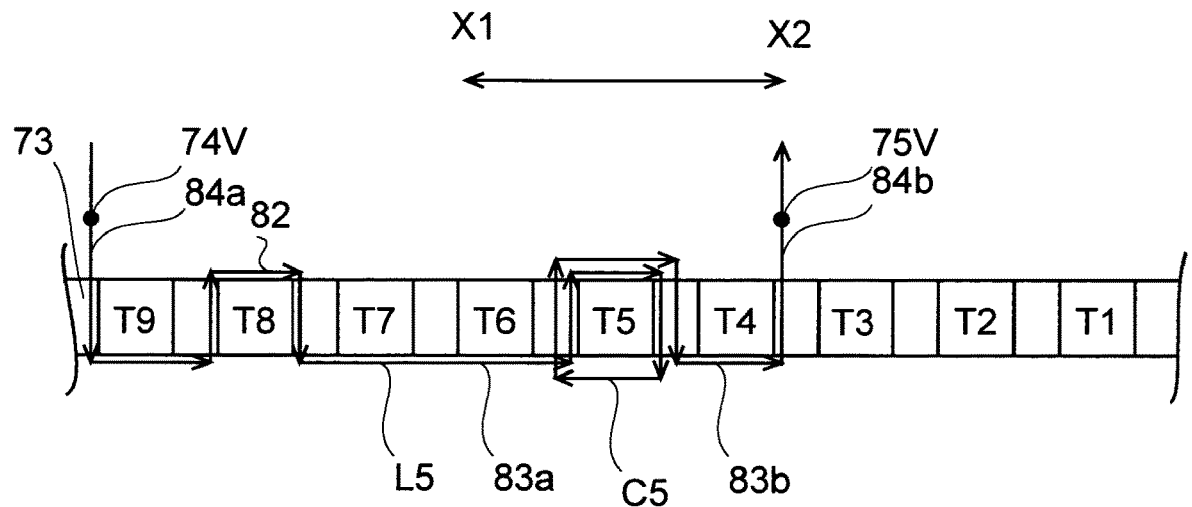
FIG. 10 is an explanatory view illustrating a winding pattern of a conducting wire of a blower according to an exemplary embodiment of the present disclosure.
Figure 11:
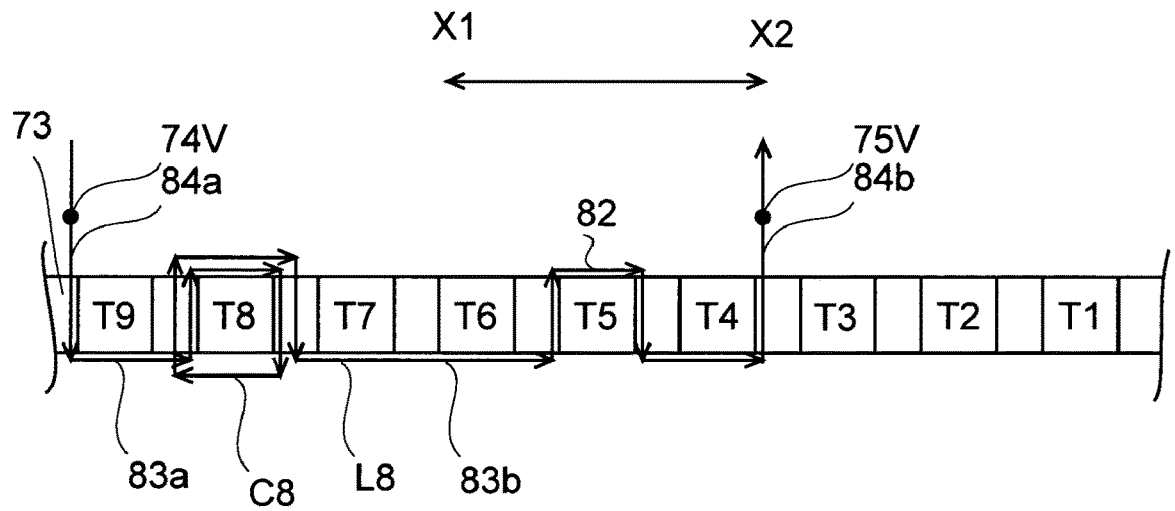
FIG. 11 is an explanatory view illustrating a winding pattern of a conducting wire of a blower according to an exemplary embodiment of the present disclosure.

As illustrated in FIGS. 9 to 11, in the conducting wires L2, L5, L8 constituting the coils C2, C5, C8 of the V-phase group of 90V, the first lead wire 84*a* extends to the lower surface side of the tooth T9 through the slot 73 between the teeth T1, T9.

The second lead wire 84*b* of the conducting wire L2 extends axially upward from the lower surface side of the tooth T3 through the slot 73 between the teeth T3, T4. The second lead wire 84*b* of the conducting wires L5, L8 extends axially upward from the lower surface side of the tooth T4 through the slot 73 between the teeth T3, T4.

The conducting wires L2, L5, L8 disposed between the first lead wire 84*a* and the second lead wire 84*b* pass through the far side in the circumferential direction. In the V-phase group 90V, all the first jumper wire 83*a* of the conducting wire L2 and the first jumper wire 83*a* and the second jumper wire 83*b* of the conducting wires L5, L8 extend from the first connector 74V toward the second connector 75V in the counterclockwise direction X2 in planar view. Thus, the change in inductance of the coils C2, C5, C8 due to the magnetic field generated by the first jumper wire 83*a* or the second jumper wire 83*b* can be reduced.

The second jumper wire 83*b* of the conducting wire L2 extends from the first connector 74V toward the second connector 75V in the clockwise direction X1 in planar view. However, the second jumper wire 83*b* of the conducting wire L2 is shorter than the first jumper wire 83*a* of the conducting wire L2, and the magnetic field generated by the second jumper wire 83*b* of the conducting wire L2 is smaller than the magnetic field generated by the first jumper wire 83*a* of the conducting wire L2. For this reason, the influence on the inductance can be ignored.

Figure 12:
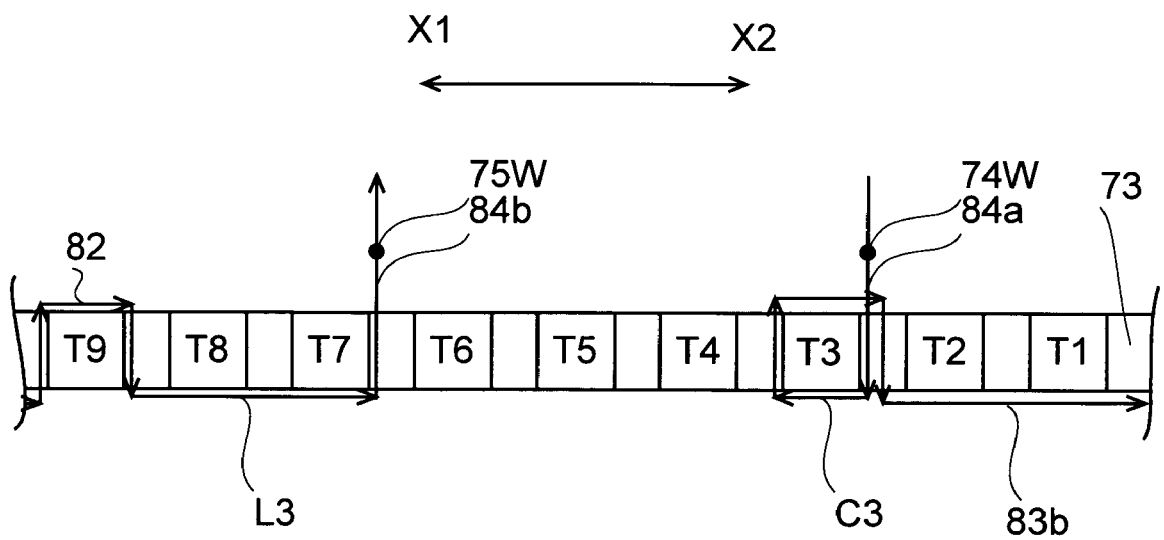
FIG. 12 is an explanatory view illustrating a winding pattern of a conducting wire of a blower according to an exemplary embodiment of the present disclosure.
Figure 13:
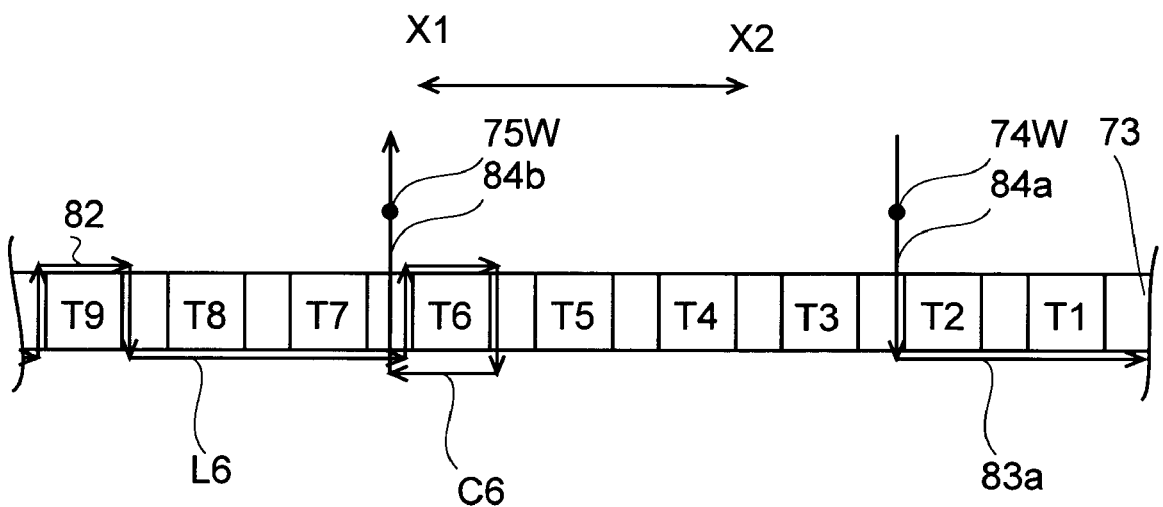
FIG. 13 is an explanatory view illustrating a winding pattern of a conducting wire of a blower according to an exemplary embodiment of the present disclosure.
Figure 14:
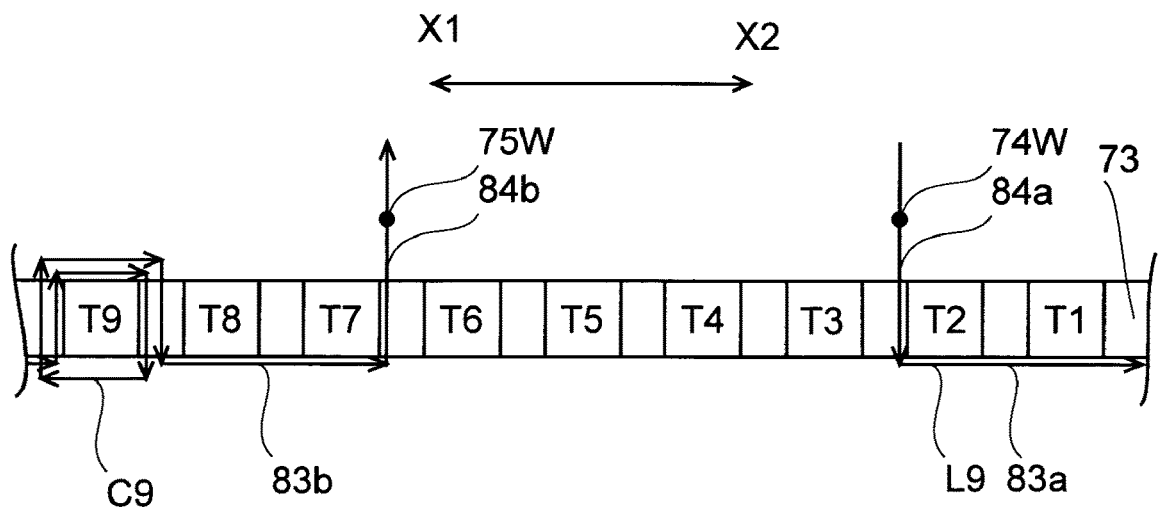
FIG. 14 is an explanatory view illustrating a winding pattern of a conducting wire of a blower according to an exemplary embodiment of the present disclosure.

As illustrated in FIGS. 12 to 14, in the conducting wire L3 constituting the coil C3 of the W-phase group 90W, the first lead wire 84*a* extends to the lower face side of the tooth T3 through the slot 73 between the teeth T2, T3. The conducting wire L3 is wound around the teeth T3 a plurality of times to form the coil C3, and then extends to the lower face side of the tooth T2.

In the conducting wires L6, L9 constituting the coils C6, C9 of the W-phase group 90W, the first lead wire 84*a* extends to the lower surface side of the tooth T2 through the slots 73 between the teeth T2, T3.

The second lead wire 84*b* of the conducting wires L3, L9 extends axially upward from the lower face side of the tooth T7 through the slot 73 between the teeth T6, T7. The second lead wire 84*b* of the conducting wire L6 is wound around the tooth T6 a plurality of times to form the coil C6, and then extends axially upward from the lower surface side of the tooth T6 through the slot 73 between the teeth T6, T7.

The conducting wires L3, L6, L9 disposed between the first lead wire 84*a* and the second lead wire 84*b* pass through the far side in the circumferential direction. In the V phase group 90V, all the first jumper wire 83*a* of the conducting wire L2 and the first jumper wire 83*a* and the second jumper wire 83*b* of the conducting wires L5, L8 extend from the first connector 74W toward the second connector 75W in the counterclockwise direction X2 in planar view. Thus, the change in inductance of the coils C3, C6, C9 due to the magnetic field generated by the first jumper wire 83*a* or the second jumper wire 83*b* can be reduced.

Another exemplary embodiment of the present disclosure will be described below. FIGS. 15 to 23 are explanatory views illustrating the winding patterns of the conducting wires constituting the U-phase group 90U, the V-phase group 90V, and the W-phase group 90W. FIGS. 15 to 23 illustrate the state in which the direction of the center axis J is viewed from the radial outside while the teeth T1 to T9 circumferentially arranged side by side are linearly developed. For convenience, the same component as that of the exemplary embodiment illustrated in FIGS. to 14 is denoted by the same reference numeral. Another exemplary embodiment differs from the exemplary embodiment in the winding pattern of the conducting wire. The other configurations are similar to those of the exemplary embodiment.

The coils C1 to C9 are formed by winding the conducting wires L1 to L9 counterclockwise around the teeth T1 to T9 a plurality of times when the direction of the center axis J is viewed from the radial outside.

The first winding unit 82 is formed by winding the conducting wires L1 to L9 counterclockwise around the tooth T a half turn when the direction of the center axis J is viewed from the radially outer side. In the conducting wires L6, L9, the first winding unit 82 is formed by winding the first winding unit 82 counterclockwise around the tooth T3 one turn.

Figure 15:
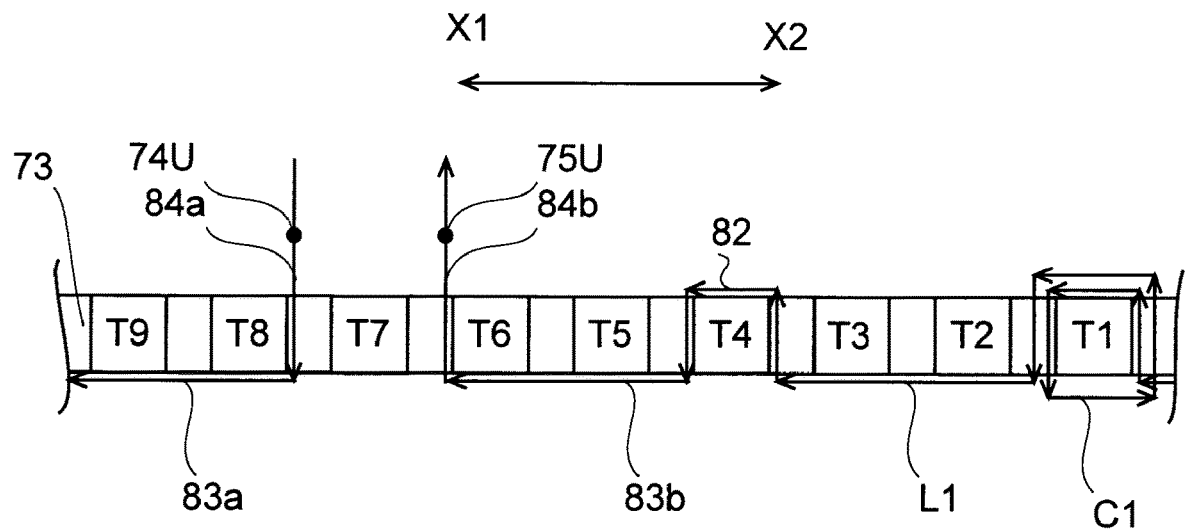
FIG. 15 is an explanatory view illustrating a winding pattern of a conducting wire of a blower according to another exemplary embodiment of the present disclosure.
Figure 16:
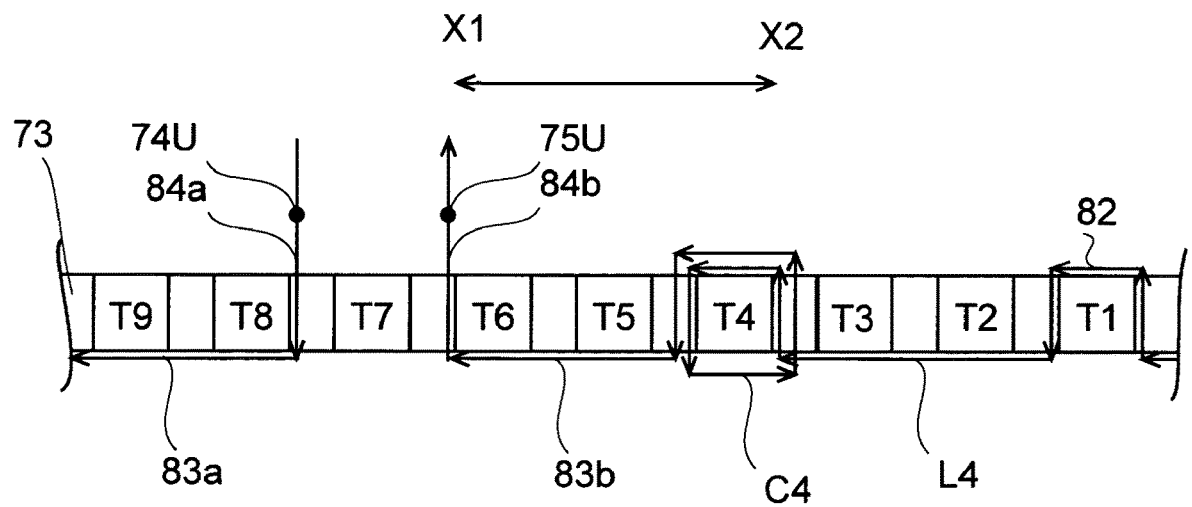
FIG. 16 is an explanatory view illustrating a winding pattern of a conducting wire of a blower according to another exemplary embodiment of the present disclosure.
Figure 17:
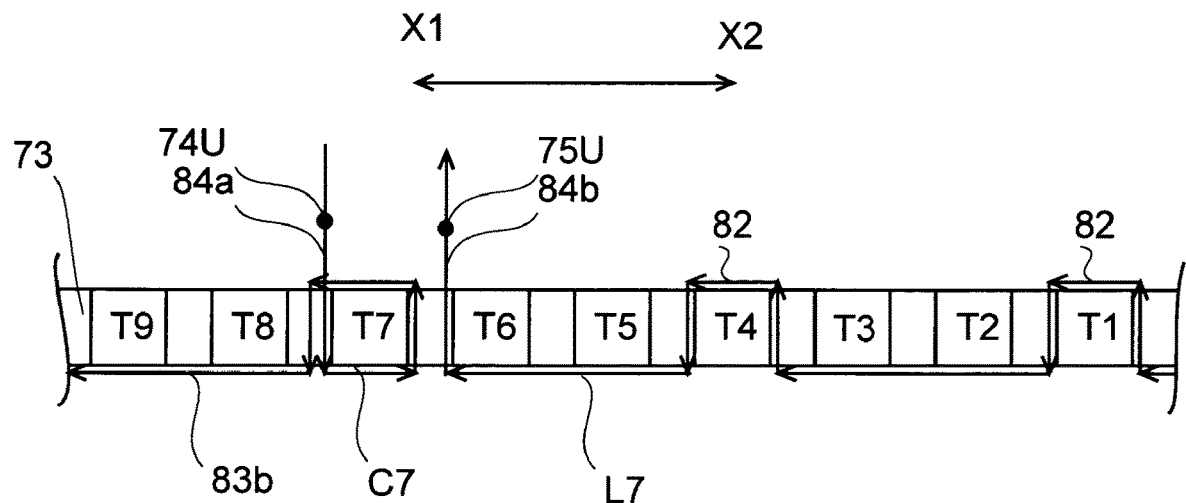
FIG. 17 is an explanatory view illustrating a winding pattern of a conducting wire of a blower according to another exemplary embodiment of the present disclosure.

As illustrated in FIGS. 15 to 17, in the conducting wires L1, L4 constituting the coils C1, C4 of the U phase group 90U, the first lead wire 84*a* extends to the lower surface side of the tooth T8 through the slot 73 between the teeth T7, T8.

In the conducting wire L7 constituting the coil C7 of the U phase group 90U, the first lead wire 84*a* extends to the lower surface side of the tooth T7 through the slot 73 between the teeth T7, T8. The conducting wire L7 is wound around the tooth T7 a plurality of times to form the coil C7, and then extends to the lower surface side of the tooth T8.

The second lead wire 84b of the conducting wires L1, L4, L7 extends axially upward from the lower face side of the tooth T6 through the slot 73 between the teeth T6, T7.

All the conducting wires L1, L4, L7 disposed between the first lead wire 84a and the second lead wire 84b pass through the far side in the circumferential direction. In the U-phase group 90U, all the first jumper wire 83a and the second jumper wire 83b of the conducting wires L1, L4 and the second jumper wire 83b of the conducting wire L7 extend from the first connector 74U toward the second connector 75U in the clockwise direction X1 in planar view. Thus, the change in inductance of the coils C1, C4, C7 due to the magnetic field generated by the first jumper wire 83a or the second jumper wire 83b can be reduced. Thus, the rotation unevenness of the rotor 60 can be prevented.

Figure 18:
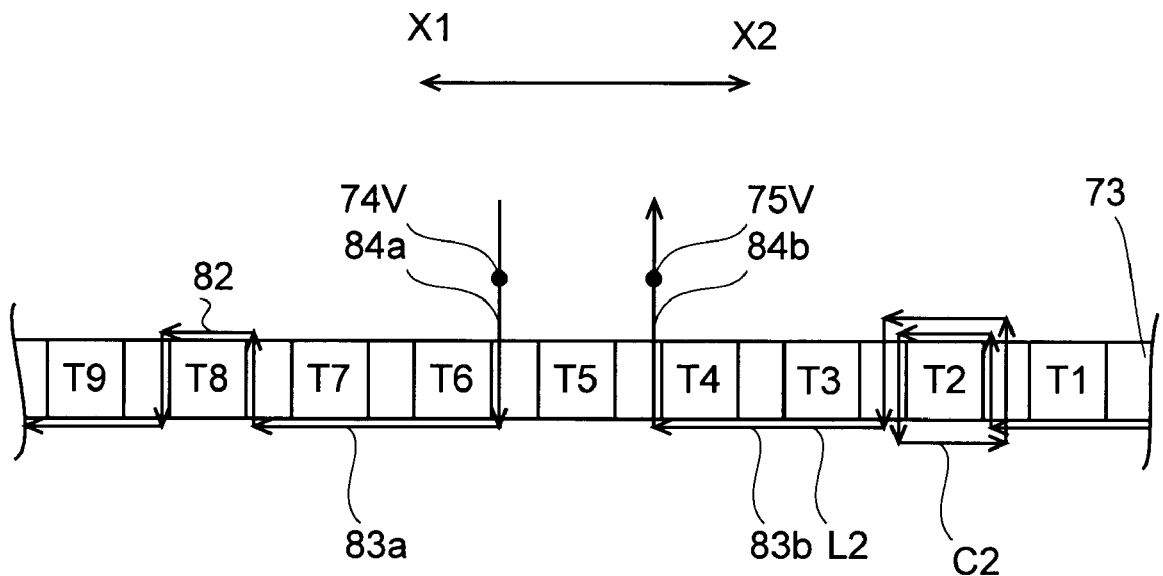
FIG. 18 is an explanatory view illustrating a winding pattern of a conducting wire of a blower according to another exemplary embodiment of the present disclosure.
Figure 19:
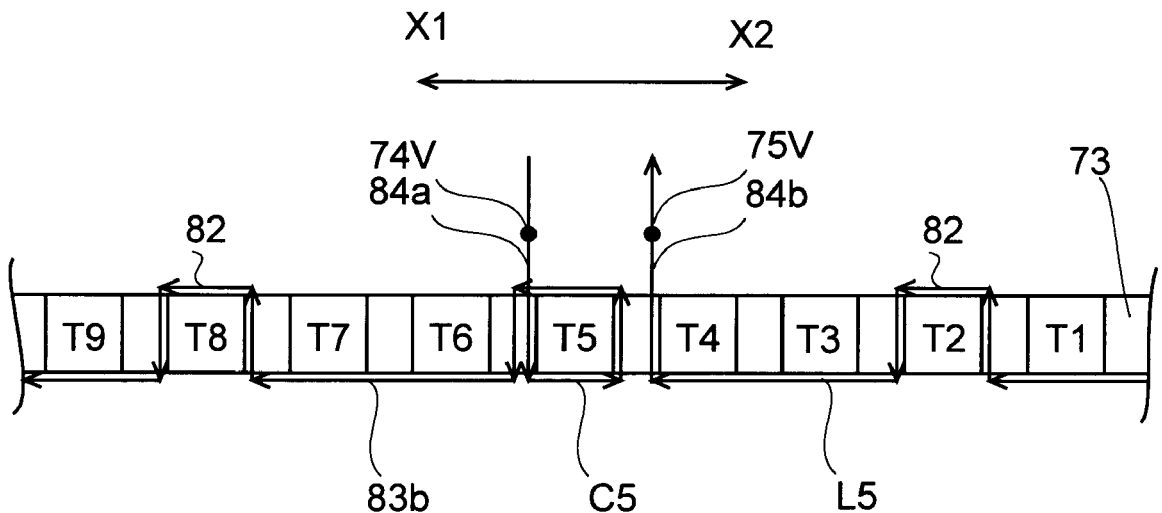
FIG. 19 is an explanatory view illustrating a winding pattern of a conducting wire of a blower according to another exemplary embodiment of the present disclosure.
Figure 20:
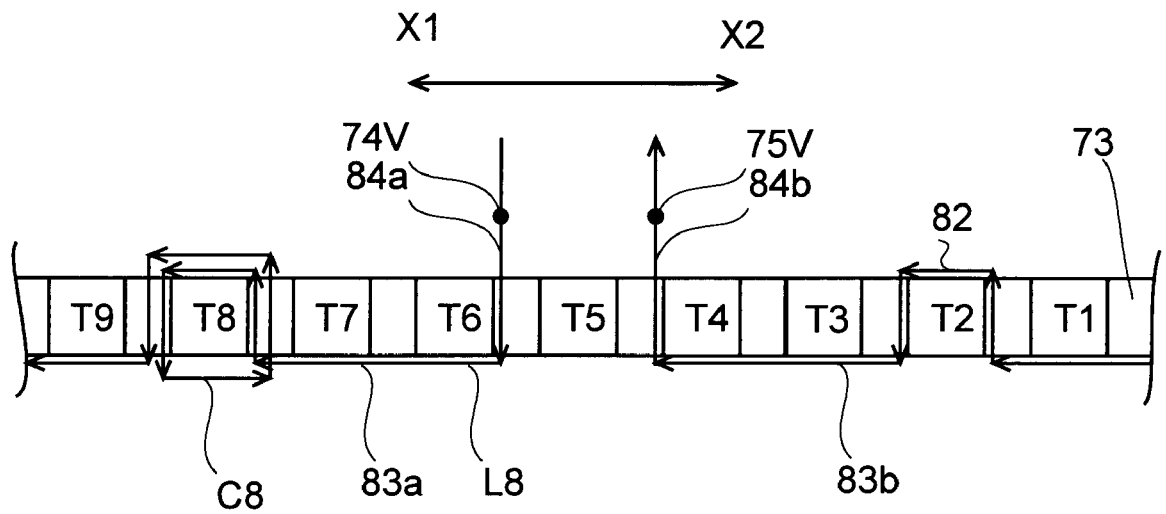
FIG. 20 is an explanatory view illustrating a winding pattern of a conducting wire of a blower according to another exemplary embodiment of the present disclosure.

As illustrated in FIGS. 18 to 20, in the conducting wires L2, L8 constituting the coils C2, C8 of the V-phase group of 90V, the first lead wire 84a extends to the lower surface side of the tooth T6 through the slot 73 between the teeth T5, T6.

In the conducting wire L5 constituting the coil C5 of the V-phase group 90V, the first lead wire 84a extends to the lower surface side of the tooth T5 through the slot 73 between the teeth T5, T6. The conducting wire L5 is wound around the tooth T5 a plurality of times to form the coil C5, and then extends to the lower surface side of the tooth T6.

The second lead wire 84b of the conducting wires L2, L5, L8 extends axially upward from the lower face side of the tooth T4 through the slot 73 between the teeth T4, T5.

All the conducting wires L2, L5, L8 disposed between the first lead wire 84a and the second lead wire 84b pass through the far side in the circumferential direction. In the V-phase group 90V, all the first jumper wire 83a and the second jumper wire 83b of the conducting wires L2, L8 and the second jumper wire 83b of the conducting wire L5 extend from the first connector 74V toward the second connector 75V in the clockwise direction X1 in planar view. Thus, the change in inductance of the coils C2, C5, C8 due to the magnetic field generated by the first jumper wire 83a or the second jumper wire 83b can be reduced. Thus, the rotation unevenness of the rotor 60 can be prevented.

Figure 21:
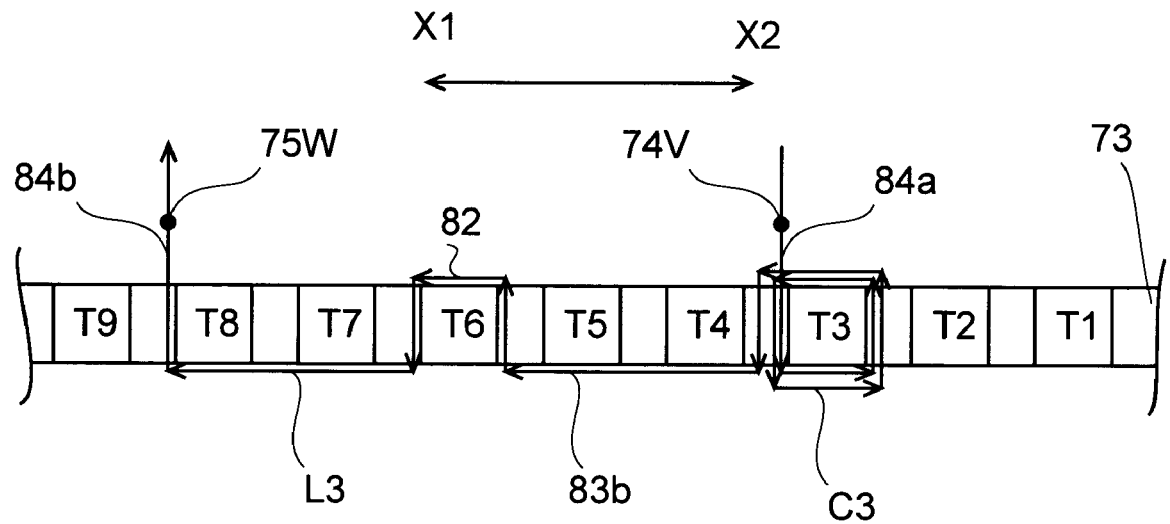
FIG. 21 is an explanatory view illustrating a winding pattern of a conducting wire of a blower according to another exemplary embodiment of the present disclosure.
Figure 22:
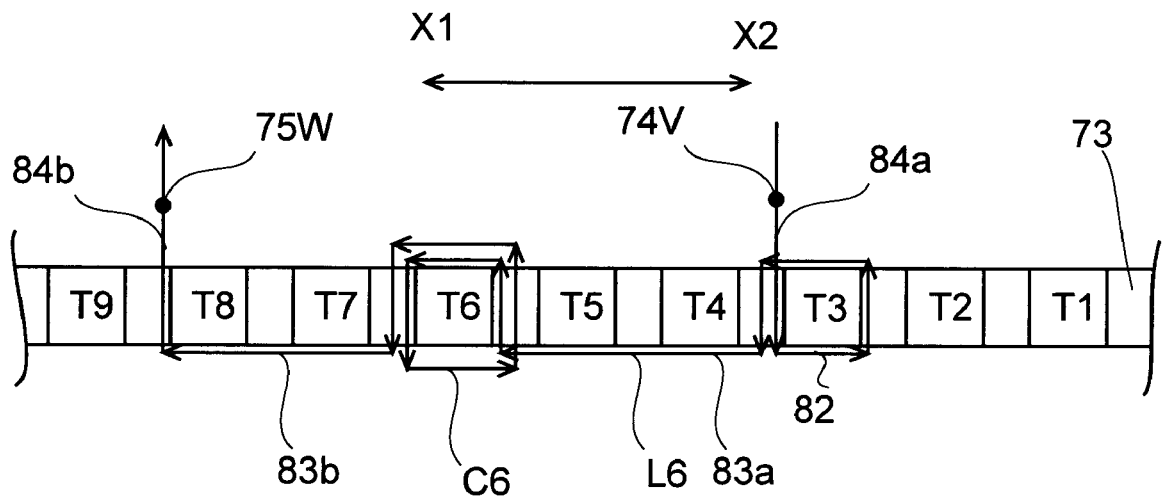
FIG. 22 is an explanatory view illustrating a winding pattern of a conducting wire of a blower according to another exemplary embodiment of the present disclosure.
Figure 23:
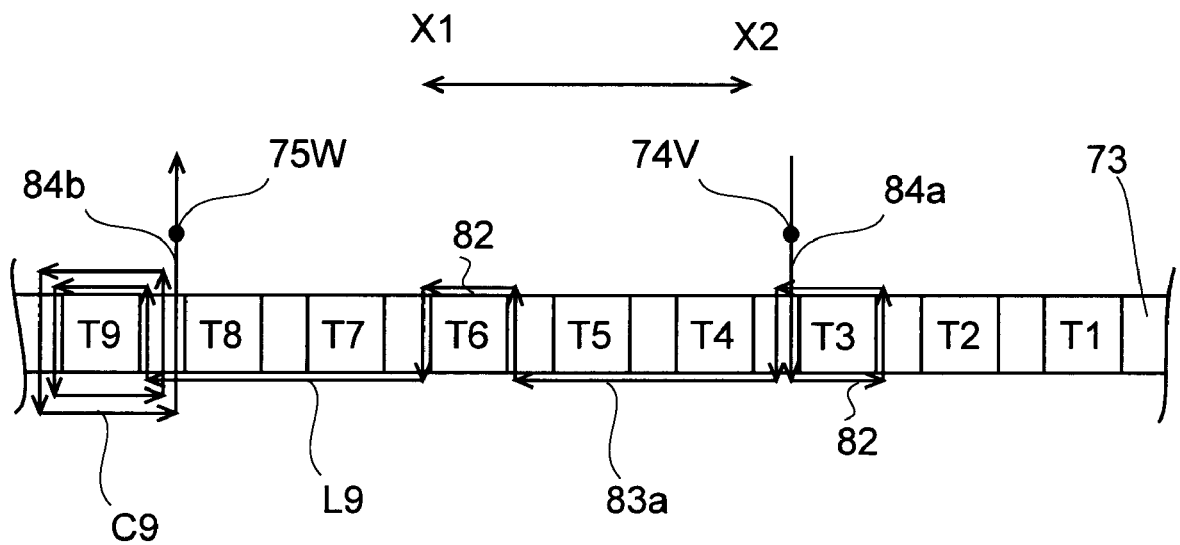
FIG. 23 is an explanatory view illustrating a winding pattern of a conducting wire of a blower according to another exemplary embodiment of the present disclosure.

As illustrated in FIGS. 21 to 23, in the conducting wire L3 constituting the coil C3 of the W-phase group 90W, the first lead wire 84a extends to the lower face side of the tooth T3 through the slot 73 between the teeth T3, T4. The conducting wire L3 is wound around the tooth T3 a plurality of times to form the coil C3, and then extends to the lower surface side of the tooth T4.

In the conducting wires L6, L9 constituting the coils C6, C9 of the W-phase group 90W, the first lead wire 84a extends to the lower surface side of the tooth T3 through the slots 73 between the teeth T3, T4. The conducting wire L3 is wound around the tooth T3 one turn, and then extends to the lower surface side of the tooth T4.

The second lead wire 84b of the conducting wires L3, L6 extends axially upward from the lower face side of the tooth T8 through the slot 73 between the teeth T8, T9.

The second lead wire 84b of the conducting wire L9 is wound around the tooth T9 a plurality of times to form the coil C9, and then extends axially upward from the lower surface side of the tooth T9 through the slot 73 between the teeth T8, T9.

All the conducting wires L3, L6, L9 disposed between the first lead wire 84a and the second lead wire 84b pass through the far side in the circumferential direction. In the W-phase group 90W, all the second jumper wire 83b of the conducting wire L3, the first jumper wire 83a and the second jumper wire 83b of the conducting wire L6, and the first jumper wire 83a of the conducting wire L9 extend from the first connector 74V toward the second connector 75V in the clockwise direction X1 in planar view. Thus, the change in inductance of the coils C3, C6, C9 due to the magnetic field generated by the first jumper wire 83a or the second jumper wire 83b can be reduced. Thus, the rotation unevenness of the rotor 60 can be prevented.

For example, the present disclosure can be used for blowers mounted on OA instruments, medical instruments, household electrical appliances, and transportation instruments.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A stator of a polyphase motor in which in-phase coils are connected in parallel, the stator comprising:
   an annular core back;
   a plurality of teeth extending radially from the core back and arranged circumferentially;
   a slot between an adjacent pair of the teeth;
   conducting wires respectively wound around the teeth to define the coils; and
   a first connector and a second connector to which a first end and a second end of each of the plurality of in-phase coils are connected, respectively; wherein
   each of the conducting wires includes one or two jumper wires disposed between each of the coils and the first connector or the second connector; and
   the one or two jumper wires of all of the plurality of in-phase coils of the conducting wires of each phase have an identical winding direction about a circumference of the annular core back from the first connector toward the second connector.

2. The stator according to claim 1, wherein the jumper wire disposed between the first connector and the second connector passes along a longest possible path between the first connector and the second connector in the circumferential direction.

3. The stator according to claim 1, wherein the coils adjacent in the circumferential direction are different from each other in a phase.

4. The stator according to claim 1, wherein
   in the coils, current of each phase of three-phase alternating current flows; and
   three of the coils are connected in parallel.

5. The stator according to claim 1, wherein the coils are connected by a delta connection.

6. The stator according to claim 1, wherein
   each of the conducting wires includes a first winding unit disposed between the first connector and the second connector and wound around each of the teeth more than a half turn and less than one turn; and
   the first winding unit is disposed in one of the teeth that is identical to that of the in-phase coil connected in parallel.

7. The stator according to claim 1, wherein the parallel-connected in-phase conducting wires are extracted from an identical slot.

8. The stator according to claim 1, wherein the first connector and the second connector are disposed on a radial interior of the slot.

9. The stator according to claim 1, wherein the at least one jumper wire is disposed on a first side in an axial direction of each of the teeth, and the first connector and the second connector are disposed on a second side in the axial direction of each of the teeth.

10. The stator according to claim 1, wherein each of the teeth extends radially outward from the core back.

11. A motor comprising:
the stator according to claim 1; and
a rotor that rotates around a center axis and radially opposed to the stator.

12. A blower comprising:
the motor according to claim 11; and
an impeller that is fixed to the rotor and rotates around a center axis.

* * * * *